US010637718B2

(12) United States Patent
Lakshminarayan et al.

(10) Patent No.: US 10,637,718 B2
(45) Date of Patent: Apr. 28, 2020

(54) SYSTEMS AND METHODS FOR COOPERATIVE NETWORK MANAGEMENT

(71) Applicant: Honeywell International Inc., Morristown, NJ (US)

(72) Inventors: Nagaraj Chickmagalur Lakshminarayan, Bangalore (IN); Sandeep Suresh, Bangalore (IN); Sachin Maganti Prakash, Bangalore (IN); Brahmaji Mugada, Bangalore (IN)

(73) Assignee: ADEMCO INC., Golden Valley, MN (US)

( * ) Notice: Subject to any disclaimer, the term of this patent is extended or adjusted under 35 U.S.C. 154(b) by 194 days.

(21) Appl. No.: 15/855,689

(22) Filed: Dec. 27, 2017

(65) Prior Publication Data
US 2019/0199578 A1   Jun. 27, 2019

(51) Int. Cl.
| | |
|---|---|
| *G08B 21/18* | (2006.01) |
| *G08B 25/00* | (2006.01) |
| *G08B 29/18* | (2006.01) |
| *H04L 12/24* | (2006.01) |
| *H04L 29/06* | (2006.01) |

(Continued)

(52) U.S. Cl.
CPC ........ *H04L 41/0668* (2013.01); *G08B 21/182* (2013.01); *G08B 25/007* (2013.01);
(Continued)

(58) Field of Classification Search
CPC .... G08B 21/182; G08B 25/007; G08B 25/10; G08B 29/185; H04L 41/0668;
(Continued)

(56) References Cited

U.S. PATENT DOCUMENTS

| | | |
|---|---|---|
| 7,079,831 B2 | 7/2006 | Schwartzman et al. |
| 9,420,592 B2 | 4/2016 | Choi et al. |
| 9,603,152 B2 | 3/2017 | Nam et al. |

FOREIGN PATENT DOCUMENTS

| | | |
|---|---|---|
| EP | 2 384 078 A1 | 11/2011 |
| KR | 10-2016-0077992 A | 7/2016 |

(Continued)

OTHER PUBLICATIONS

Extended European search report for corresponding EP patent application 18195693.9, dated Mar. 18, 2019.
(Continued)

*Primary Examiner* — Melvin C Marcelo
*Assistant Examiner* — Natali Pascual Peguero
(74) *Attorney, Agent, or Firm* — Husch Blackwell LLP

(57) ABSTRACT

Systems and methods are provided that include a control panel of a security system receiving results from a scan of first operating channels of a first wireless protocol conducted a plurality of wireless security sensors, determining which of second operating channels of a second wireless protocol include wireless communication, determining that a first of the first operating channels of the first wireless protocol fails to overlap with the second operating channels of the second wireless protocol that include the wireless communication, determining whether the results from the scan indicate that the first of the first operating channels of the first wireless protocol includes interference at any of the plurality of wireless security sensors, and migrating the wireless communication with the plurality of wireless security sensors to the first of the first operating channels of the first wireless protocol.

21 Claims, 5 Drawing Sheets

(51) Int. Cl.
  *H04L 29/08* (2006.01)
  *H04L 29/14* (2006.01)
  *H04W 4/38* (2018.01)
  *H04W 72/12* (2009.01)
  *G08B 25/10* (2006.01)
  *H04W 84/18* (2009.01)

(52) U.S. Cl.
  CPC ........... *G08B 25/10* (2013.01); *G08B 29/185* (2013.01); *H04L 67/12* (2013.01); *H04L 67/148* (2013.01); *H04L 69/18* (2013.01); *H04L 69/40* (2013.01); *H04W 4/38* (2018.02); *H04W 72/1215* (2013.01); *H04W 84/18* (2013.01)

(58) Field of Classification Search
  CPC ....... H04L 67/12; H04L 67/148; H04L 69/18; H04L 69/40; H04W 4/38; H04W 72/1215; H04W 84/18
  USPC .................................................. 370/228, 254
  See application file for complete search history.

(56) References Cited

FOREIGN PATENT DOCUMENTS

KR   KR-20160077992 A  *  7/2016   ........ H04W 72/1215
WO   WO 2015/187860 A1   12/2015

OTHER PUBLICATIONS

English-language translation of KR patent publication 10-2016-0077992, dated Jul. 4, 2016.
Huang et al., A WLAN and ZigBee Coexistence Mechanism for Wearable Health Monitoring System, Comunications and Informaton Technology, 2009, ISCIT 2009, 9th International Symposium on, IEEE, Piscataway, NJ, USA, pp. 555-559, Sep. 28, 2009.
Jung et al., Ubiquitous Wearable Computer (UWC) Aided Coexistence Algorithm in an Overlaid Network Environment of WLAN and ZigBee Networks, Wireless Pervasive Computing, 2007, ISWPC 2007, 2nd International Symposium on, IEEE, No. 2th, pp. 212-217, Feb. 1, 2007.

* cited by examiner

| Parameters | Default Values | Max | Min |
|---|---|---|---|
| Wi-Fi thershold | -40dBm | -10dBm | -100 |
| ED/AP energy scan threshold for IC/new channel | 0xB4 | 0xFF | 0x01 |
| Jam configuration | 0xB4 | 0xFF | 0x01 |
| Percentage of time occupied during ED scan | 40% | 100% | 30% |
| Non TDMA threshold count | 25 | 255 | 1 |
| UL threshold count | 1 | 255 | 1 |
| Non UL threshold count | 5 | 255 | 1 |
| Accept time out | 70 min | 255 min | 1 Min |
| Number FA count | 24 | 24 | 0 |
| Switch over time out | 10 min | 255 min | 1 Min |

FIG. 5

SYSTEMS AND METHODS FOR COOPERATIVE NETWORK MANAGEMENT

FIELD

The present invention relates generally to wireless communication. More particularly, the present invention relates to systems and methods for managing or limiting wireless network interference.

BACKGROUND

Security systems are known to detect threats within a secured area. Such threats include events that represent a risk to human safety or a risk to assets.

Security systems typically include one or more sensors that detect the threats within the secured area. For example, smoke, motion, and/or intrusion sensors are distributed throughout the secured area in order to detect the threats.

In most cases, the sensors are monitored by a control panel, and in some situations, the control panel wirelessly communicates with the sensors via an Institute of Electrical and Electronics Engineers (IEEE) 802.15.4 protocol (e.g. ZigBee, Thread, Honeywell SiX™, etc.). Furthermore, when one of the sensors is activated, the control panel sends an alarm message to a central monitoring station, and in some situations, the control panel wirelessly communicates the alarm message to the central monitoring station or a user device via a router using an IEEE 802.11 Wi-Fi protocol.

However, when such wireless communication occurs, several wireless protocols (e.g. LTE, IEEE 802.11, IEEE 802.15.4) are competing for a limited amount of wireless bandwidth in the same wireless band (e.g. 2.4 GHz). This issue of limited bandwidth is exacerbated when numerous devices, such as mobile devices, cell phones, and security system sensors, all communicate wirelessly within the same wireless band, thereby raising the potential for communication interference. Accordingly, there exists a need for improved systems and methods for limiting wireless communication interference.

BRIEF DESCRIPTION OF THE DRAWINGS

FIG. 5 is a table of interference thresholds in accordance with disclosed embodiments.

DETAILED DESCRIPTION

Figure 1:
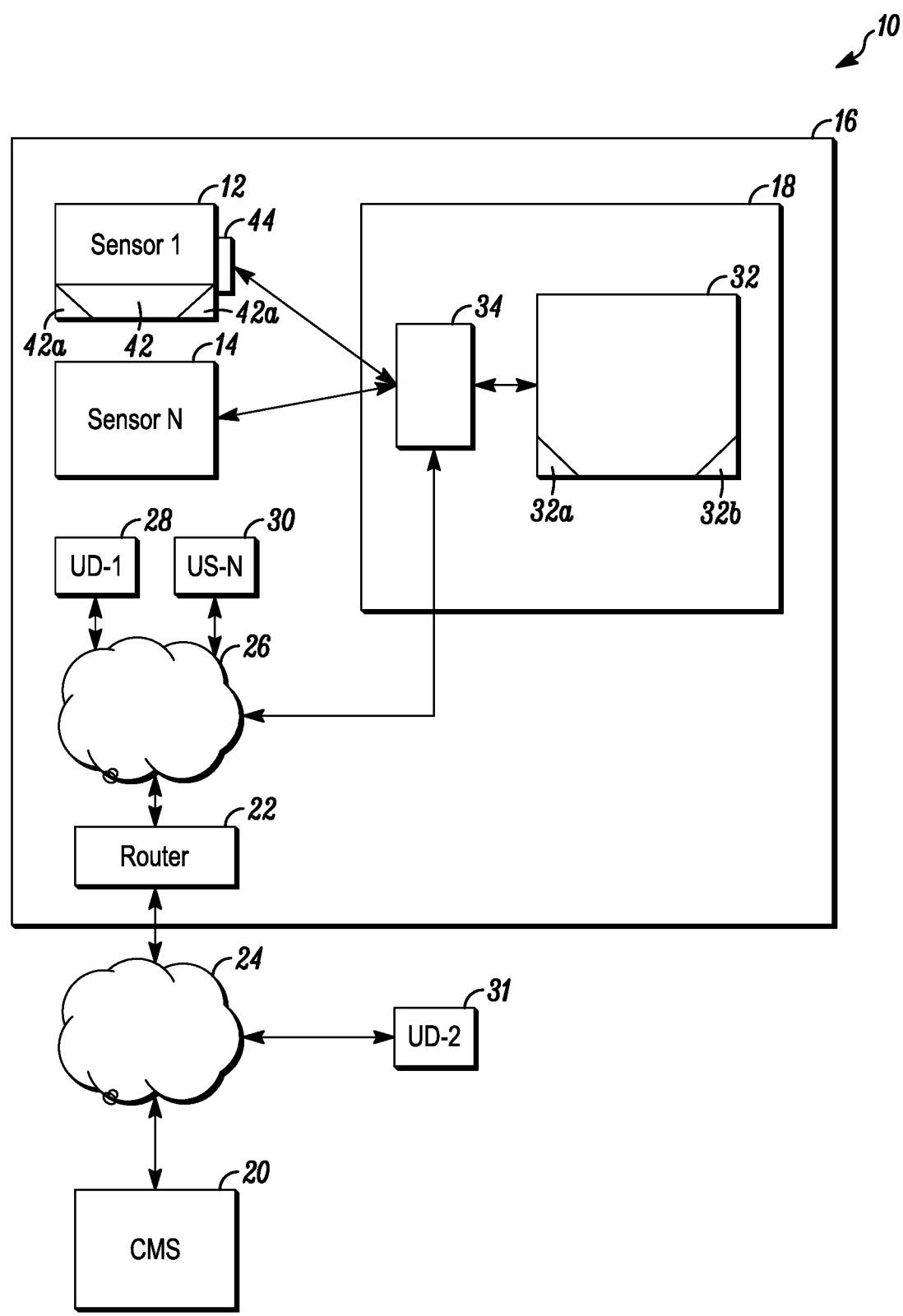
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for ensuring that communication between a control panel of a security system and wireless security sensors of the security system occurs on an operating channel of a first wireless protocol (e.g. IEEE 802.15.4) substantially free of WiFi interference or with no more than a predetermined amount of interference while. For example, in some embodiments, one or both of the control panel and the wireless security sensors can scan operating channels of the first wireless protocol to determine a respective level of wireless interference within each of the operating channels of the first wireless protocol. Based on the scan of the operating channels of the first wireless protocol, the control panel can determine whether to migrate wireless communication with the wireless security sensors from a first of the operating channels of the first wireless protocol to a second of the operating channels of the first wireless protocol, and in some embodiments, such migration can occur automatically and within a few seconds or less.

Figure 2:
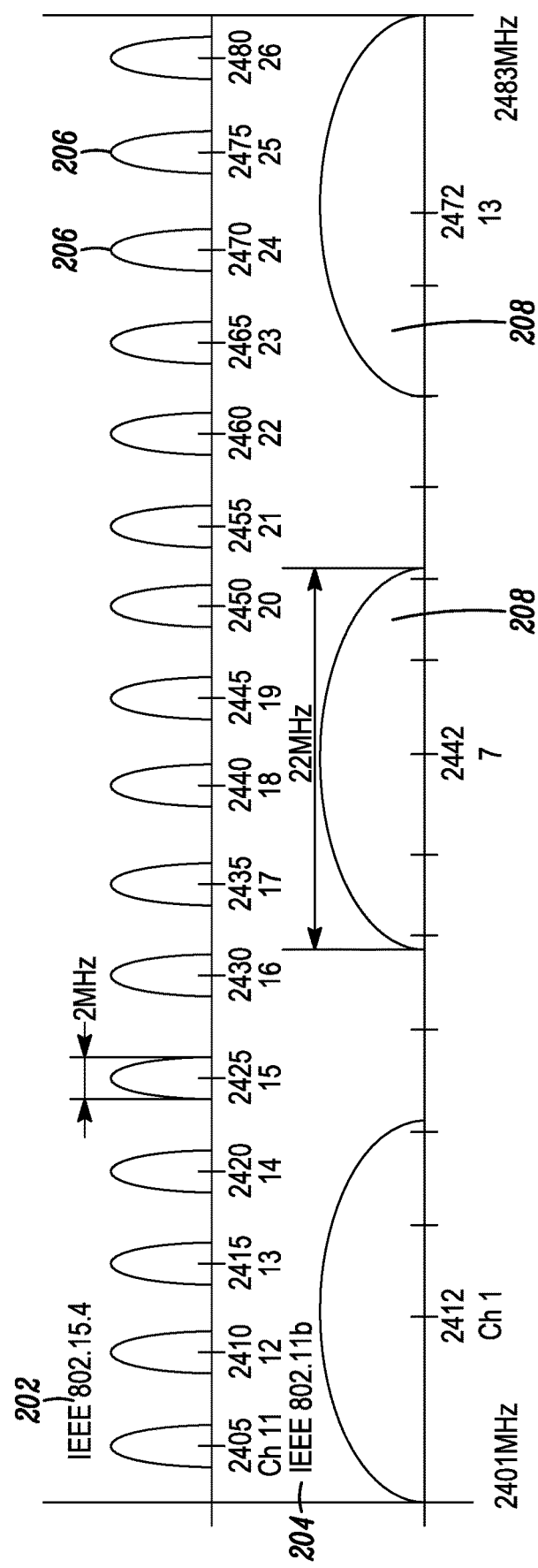
FIG. 2 is a graph illustrating operating channels for a first wireless protocol and a second wireless protocol in accordance with disclosed embodiments.

In some embodiments, the wireless security sensors can communicate data, such as data indicating detection of a security threat in a secured area, to the control panel via an Institute of Electrical and Electronics Engineers (IEEE) 802.15.4 operating channel. Furthermore, various other devices in the secured area, such as mobile phones, laptops, computers, tablets, etc., may communicate with a router on a wireless local area network (WLAN) via an IEEE 802.11 operating channel. Because both the IEEE 802.11 and 802.15.4 operating channels utilize the same wireless band (e.g. 2 GHz band, as shown in FIG. 2), the IEEE 802.11 operating channel may overlap with and interfere with the IEEE 802.15.4 operating channel. Such interference can prevent critical security messages from being received by the control panel, thereby preventing the security system from reporting an alarm situation, which can cause a danger to people or assets within the secured area.

In some embodiments, each of the wireless security sensors can scan some or all of the IEEE 802.15.4 operating channels to determine whether detected interference exceeds a threshold, and in some embodiments, each of the wireless security sensors can report which of the IEEE 802.15.4 operating channels include the detected interference that exceeds the threshold to the control panel. Additionally or alternatively, in some embodiments, the control panel can execute one or both of an IEEE 802.11 WiFi scan to determine which of the IEEE 802.11 operating channels includes traffic that exceeds the threshold and an IEEE 802.15.4 scan to determine which of the IEEE 802.15.4 operating channels includes traffic that exceeds the threshold. In any embodiment, the control panel can use data from the scan(s) to determine which of the IEEE 802.15.4 operating channel has the least amount of interference or traffic and is, therefore, best suited for wireless communication with the wireless security sensors.

In some embodiments, the control panel can execute the scans at regular intervals or can instruct the wireless security sensors to execute the scans at regular intervals. Additionally or alternatively, in some embodiments, the control panel can execute the scans in response to triggers from input parameters that indicate interference. For example, in some embodiments, the control panel can receive or detect the input parameters that indicate the interference, such as by the control panel detecting an operating channel jam, an incomplete packet transmitted from one of the wireless security sensors, or a change to the IEEE 802.11 operating channel of a WiFi router, which can trigger the control panel to scan the IEEE 802.15.4 operating channels and instruct the wireless security sensors to scan the IEEE 802.15.4 operating channels. After executing the scans, the control panel can determine the an optimal one of the IEEE 802.15.4 operating channels for wireless communication with the wireless security sensors and move all IEEE 802.15.4 communication to the optimal one of the IEEE 802.15.4 operating channels, if necessary.

In some embodiments, the control panel can be connected to the WiFi router, know the IEEE 802.11 operating channel of the WiFi router, and, therefore, avoid selecting one of the IEEE 802.15.4 operating channels that interferes with the IEEE 802.11 operating channel of the WiFi router. The control panel may also detect other WiFi sources, such as by receiving nearby WiFi service set identifiers (SSIDs) from the other WiFi sources. However, still other interference sources (e.g. other routers near the secured area or noise) may exist. Therefore, the control panel can scan some or all IEEE 802.15.4 operating channels to determine whether any interference thereon exceeds one or more thresholds. Furthermore, because interference may increase or decrease at specific locations within the secured area, each of the wireless security sensors can also scan the IEEE 802.15.4 operating channels to determine whether any interference thereon exceeds the one or more thresholds. Thus, the system and methods describe herein can account for interference at all locations where security system devices are placed.

In some embodiments, the wireless security sensors or the control panel can detect interference on the IEEE 802.15.4 operating channels by determining that a measured variable exceeds the one or more threshold values. Furthermore, in some embodiments, the control panel can identify and communicate the one or more threshold values to the wireless security sensors, and the wireless security sensors can store the one or more threshold values in computer-readable memory and determine whether a measured parameter on one of the IEEE 802.15.4 operating channels exceeds the one or more threshold values. In some embodiments, the control panel and the wireless security sensors can measure a plurality of parameters and compare each of the plurality of parameters with a respective, corresponding one of a plurality of threshold values.

In some embodiments, the one or more threshold values can vary based on an installation region. For example, if the security system is installed in North America, then the control panel can use a first set of threshold values. However, if the security system is installed in Europe, the Middle East, or Asia ("EMEA"), then the control panel can use a second set of threshold values. The one or more threshold values may vary in different geographical regions because wireless energies may vary in the different geographical regions.

In some embodiments, when the control panel moves all IEEE 802.15.4 communication from the first of the IEEE 802.15.4 operating channels to the second of the IEEE 802.15.4 operating channels, the control panel can transmit migration data in a beacon, such as a beacon included in a time division multiple access (TDMA) super frame, and the migration data can identify the second of the IEEE 802.15.4 operating channels, a new network ID (if necessary), and when the IEEE 802.15.4 communication will begin on the second of the IEEE 802.15.4 operating channels (e.g. the next super frame).

FIG. 1 is a block diagram of a security system 10 in accordance with disclosed embodiments. As seen in FIG. 1, the security system 10 can include one or more wireless security sensors 12, 14 that monitor a secured area 16 for threats, and in some embodiments, the wireless security sensors 12, 14 can include intrusion, camera, motion, fire, smoke, and gas detectors. The wireless security sensors 12, 14 can communicate with a control panel 18 via a first wireless protocol (e.g. IEEE 802.15.4 protocol), and the control panel 18 can monitor for activation of the wireless security sensors 12, 14. Additionally or alternatively, in some embodiments, the wireless security sensors 12, 14 can connect to an access point, and the access point can route messages from the wireless security sensors 12, 14 to the control panel 18 or a device located outside of the secured area 16.

In some embodiments, the control panel 18 may send an alarm message to a central monitoring station 20 upon the activation of one of the wireless security sensors 12, 14, and in some embodiments, the alarm message may be sent to the central monitoring station 20 through a router 22 and the Internet 24. The central monitoring station 20 may respond by summoning the appropriate help. For example, if the one of the wireless security sensors 12, 14 detects a fire, then the central monitoring station 20 may summon a local fire department. Alternatively, if the one of the wireless security sensors 12, 14 detects an intrusion, then the central monitoring station 20 may summon the police.

The router 22 can also host a wireless local area network (WLAN) 26, and one or more user devices 28, 30 (e.g., iPhones, Smart TVs, gaming consoles, Android devices, etc.) can connect to the WLAN 26 and communicate with the router 22 via a second wireless protocol (e.g., IEEE 802.11 protocol). The user devices 28, 30 may exchange data through the Internet 24 or the WLAN 26 under an appropriate format (e.g., TCP/IP, etc.), and the control panel 18 may communicate the alarm message or other status updates (e.g. live video captured by a camera 12, 14) to a remote device 31 via the router 22 and the second wireless protocol.

It is to be understood that, while systems and methods disclosed herein are described in connection with the IEEE 802.11 protocol and the IEEE 802.15.4 protocol, systems and methods disclosed herein are not so limited and can be used in connection with any wireless protocols, standards, or technologies as would understood by one of ordinary skill in the art. For example, in some embodiments, systems and methods disclosed herein can be used in connection with wireless protocols operating in the same wireless band or overlapping wireless bands, including LTE, Bluetooth, or any other IEEE protocols.

The control panel 18 can include control panel control circuitry 32, which can include one or more control panel programmable processors 32a and control panel executable control software 32b as would be understood by one of ordinary skill in the art. The control panel executable control software 32b can be stored on a transitory or non-transitory computer readable medium, including, but not limited to local computer memory, RAM, optical storage media, magnetic storage media, and the like. In some embodiments, the control panel control circuitry 32, the control panel programmable processor 32a, and the control panel control software 32b can execute and control some of the methods disclosed herein.

Furthermore, in some embodiments, the control panel 18 may include a transceiver 34 for sending and receiving IEEE 802.15.4 communication via the IEEE 802.15.4 protocol and IEEE 802.11 communication via the IEEE 802.11 protocol. According to disclosed embodiments, the control panel control circuitry 32, the control panel programmable processor 32a, and the control panel control software 32b can enable the transceiver 34 to scan operating channels of the IEEE 802.15.4 protocol or the IEEE 802.11 protocol to determine whether network traffic or interference exists on any of the operating channels scanned.

The wireless security sensors 12, 14 can also include sensor control circuitry 42, which can include one or more sensor programmable processors 42a and sensor executable control software 42b as would be understood by one of ordinary skill in the art. The sensor executable control software 42b can be stored on a transitory or non-transitory computer readable medium, including, but not limited to local computer memory, RAM, optical storage media, magnetic storage media, and the like. In some embodiments, the sensor control circuitry 42, the sensor programmable processor 42a, and the sensor control software 42b can execute and control some of the methods disclosed herein.

Furthermore, some embodiments, the wireless security sensors 12, 14 may include a sensor transceiver module 44 for sending and receiving the IEEE 802.15.4 communication via the IEEE 802.15.4 protocol. According to disclosed embodiments, the sensor control circuitry 42, the sensor programmable processor 42a, and the sensor control software 42b can enable the sensor transceiver module 44 to scan the operating channels of the IEEE 802.15.4 protocol to determine whether the network traffic or the interference exists on any of the operating channels scanned.

In some embodiments, the control panel 18 or the wireless sensors 12, 14 can periodically execute the scans of the operating or in response to triggers. For example, the triggers may include the router 22 changing an operating channel, another router nearby the secured area 16 changing an operating channel, the control panel 18 receiving scan results indicating interference from one of the wireless security sensors 12, 14, the control panel 18 receiving scan results indicating interference from an access point of the security system 10, the control panel 18 detecting an operating channel jam, or the control panel 18 detecting that communication packets from one of the wireless sensors 12, 14 are received with interference, for example, by identifying incomplete, missing, or corrupt communication packets.

FIG. 2 is a graph illustrating the 2.4 GHz band in accordance with disclosed embodiments. As seen in FIG. 2, two wireless communication protocols 202, 204 can both communicate within the 2.4 GHz band. In some embodiments, the first wireless protocol 202 can be the IEEE 802.15.4 protocol, and in some embodiments, the second wireless protocol 204 can be IEEE 802.11 protocol. Furthermore, in some embodiments, the first wireless protocol 202 can include 15 operating channels 206, numbered 11-26 in FIG. 2, in the 2.4 GHz band, and the second wireless protocol 204 can include 14 operating channels 208, three of which are numbered 1, 7, and 14 in FIG. 2, within the 2.4 GHz band. However, it is to be understood that the 2.4 GHz band can include more than the three illustrated operating channels 208 of the second wireless protocol and that some of the operating channels 208 of the second wireless protocol 204 can overlap with others of the operating channels 208 of the second wireless protocol 204. Further still, in some embodiments, each of the operating channels 206 of the first wireless protocol 202 can be 2 MHz wide, and in some embodiments, each of the operating channels 208 of the second wireless protocol 204 can be 22 MHz wide. As seen in FIG. 2, some of the operating channels 206 of the first wireless protocol 202 can overlap with some of the operating channels 208 of the second wireless protocol 204. For example, operating channel 1 of the second wireless protocol 204 can overlap with operating channels 11-14 of the first wireless protocol 204, but not with channels 15-26 of the first wireless protocol 204.

Figure 3:
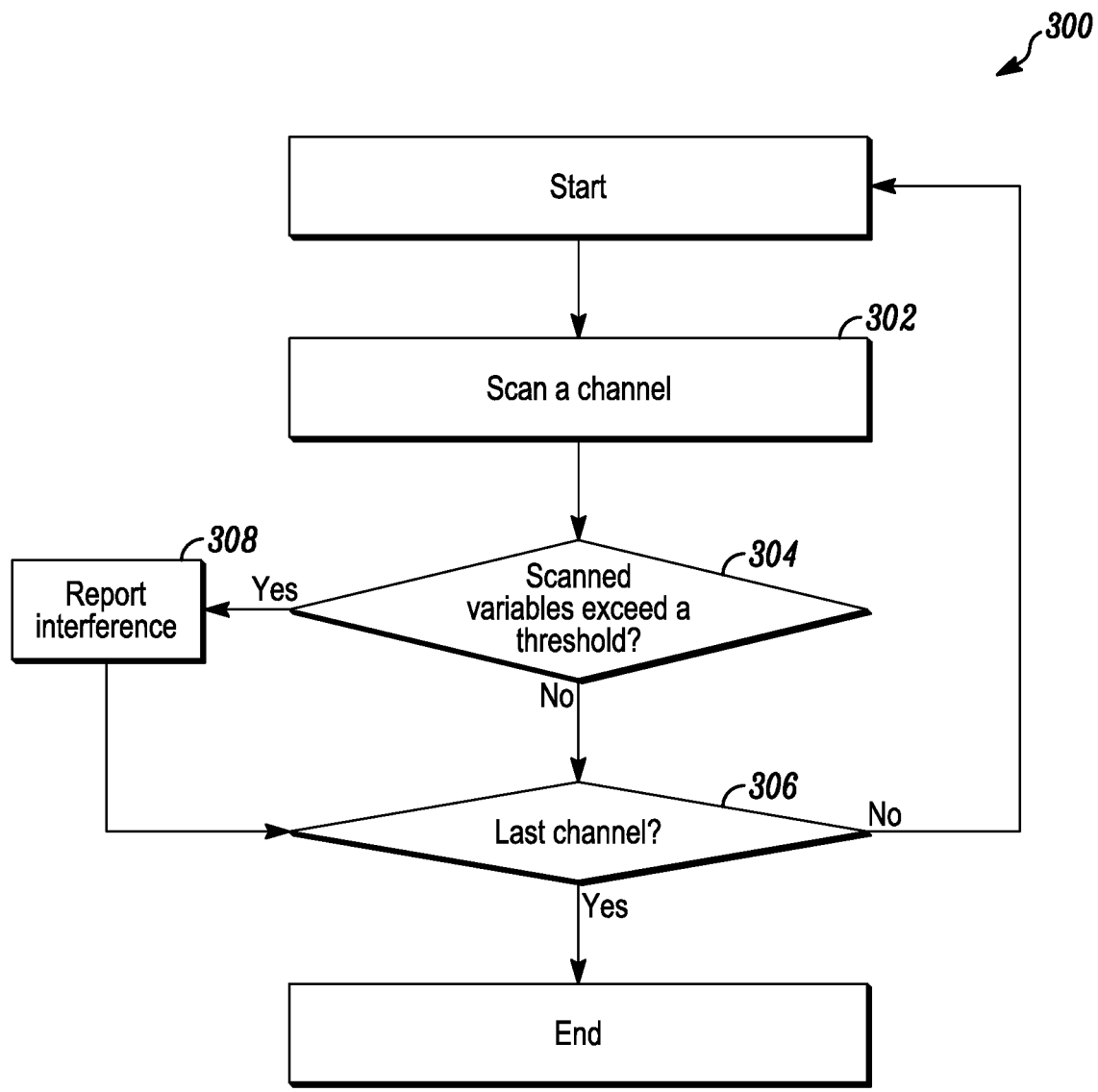
FIG. 3 is a flow diagram of a method in accordance with disclosed embodiments.

FIG. 3 is a flow diagram of a method 300 of a wireless security sensor (e.g. one of the wireless security sensors 12, 14) scanning the operating channels of the first wireless protocol (e.g. the IEEE 802.15.4 protocol) in accordance with disclosed embodiments. As seen in FIG. 3, the method 300 can include a processor of the wireless security sensor (e.g. the programmable processor 42a) scanning one of the operating channels of the first wireless protocol as in 302, and the processor of the wireless security sensor determining whether parameters detected in the one of the operating channels exceed one or more thresholds as in 304. For example, during the scan of the one of the operating channels, the wireless security sensor may detect one or more of the parameters illustrated in FIG. 5. If no parameters detected exceed the one or more thresholds as in 304, then the method 300 can include determining whether all of the operating channels of the first wireless protocol have been scanned, for example, by determining whether the one of the operating channels scanned is a last of the operating channels to scan as in 306. For example, a first of the operating channels can be channel 11 and the last of the operating channels can be channel 26. However, when the processor determines that one of the parameters scanned has exceeded the one or more thresholds as in 304, the method 300 can include the processor reporting interference on the one of the operating channels scanned as in 308. Then, the method 300 can include determining whether the one of the operating channels scanned is a last of the operating channels to scan as in 306. After the wireless security sensor has scanned the last of the operating channels, the method 300 can end. However, when the processor determines that any of the operating channels has yet to be scanned as in 306, the method 300 can repeat.

The method 300 of FIG. 3 is described in connection with the wireless security sensor executing the scan of the operating channels of the first wireless protocol, and it is to be understood that, additionally or alternatively, a control panel (e.g. the control panel 18) can execute the scan. However, the control panel can be connected to a WiFi source (e.g. the router 22) and, therefore, determine the operating channel of the WiFi source as well as the WiFi band, power, and type (e.g. IEEE 802.11 a/b/n or the like). Accordingly, during the scan, the control panel may skip some of the operating channels of the first wireless protocol known to be occupied by the WiFi source. For example, and referring again to FIG. 2, if the WiFi source is communicating using channel 1 of the second wireless protocol, then the control panel may begin scanning at channel 15 of the first wireless protocol because channels 11-14 of the first wireless protocol interfere with the WiFi source communicating on channel 1 of the second wireless protocol. In some embodiments, the control panel can scan both the operating channels of the first wireless protocol and the operating channels of the second wireless protocol.

Figure 4:
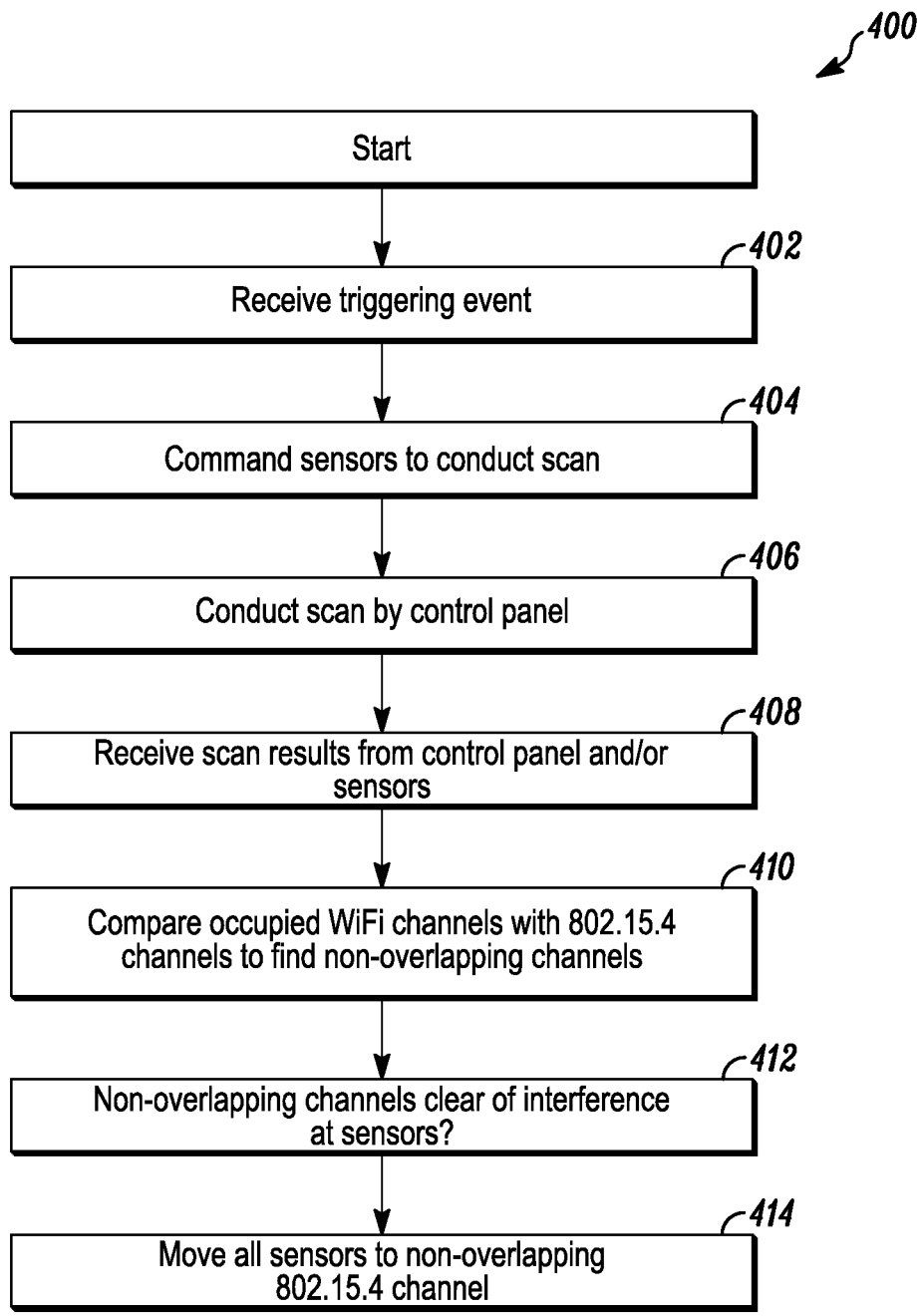
FIG. 4 is a flow diagram of a method in accordance with disclosed embodiments.

FIG. 4 is flow diagram of a method 400 of determining whether to migrate communication via the first wireless protocol from a first of the operating channels of the first wireless protocol to a second of the operating channels of the first wireless protocol in accordance with disclosed embodiments. As seen in FIG. 4, the method 400 can include the control panel detecting a triggering event as in 402. For example, the triggering event can include a current time equaling a predetermined time, the router connected to the control panel changing its operating channel, another WiFi source changing its operating channel, the control panel receiving scan results indicating interference from the wireless security sensor, the control panel detecting an operating channel jam, or the control panel detecting packet loss.

After the control panel receives the triggering event as in 402, the method 400 can include sending a command to all wireless security sensors connected to the control panel to commence the scan of all of the operating channels of the first wireless protocol (e.g. the method 300) as in 404, and the control panel executing the scan of either the operating channels of the first wireless protocol or the operating channels of the second wireless protocol as in 406. In some embodiments, the control panel may generate a scan report that lists all WiFi sources and their channels, and the scan report may indicate which of the operating channels of the second wireless protocol are occupied by the WiFi sources and which of the operating channels of the second wireless protocol are unoccupied, or the scan report may rank the operating channels of the second wireless protocol by energy level, which can be used by the control panel to rank the operating channels of the second wireless protocol based on the least amount of interference. Furthermore, the method 400 can include the control panel receiving the scan results from the wireless security sensors as in 408, and the control panel comparing occupied ones of the operating channels of the second wireless protocol with the working ones of the operating channels of the first wireless protocol to identify unoccupied ones of the operating channels of the first wireless protocol as in 410. If all of the operating channels of the first wireless protocol are occupied, then the control panel may identify one of the operating channels of the first wireless protocol with the least amount of wireless energy. Further still, the method 400 can include the control panel determining whether the unoccupied ones or highest ranked ones of the operating channels of the first wireless protocol are free of interference at the wireless security sensors based on the scan results from the wireless security sensors as in 412, and the control panel migrating the wireless security sensors to the unoccupied ones of the operating channels of the first wireless protocol when the unoccupied ones of the operating channels of the first wireless protocol are different than a currently used one of the operating channels of the first wireless protocol as in 414. When deciding to execute such migration, the control panel can track the migration of all of the wireless security sensors to ensure that all of the wireless security sensors move to the unoccupied ones of the operating channels of the first wireless protocol, and the control panel can execute the migration without changing any of the operating channels of the second wireless protocol.

FIG. 5 is a table of interference thresholds used by the control panel and the wireless security sensors for different parameters in accordance with disclosed embodiments. For example, the control panel or the wireless security sensors can measure any of the following parameters: WiFi power in terms of decibels, energy scan parameters, number of packets transmitted during interference, percentage of time occupied during an energy scan, Underwriters limited (UL) threshold values, and jam detection thresholds in terms of time and energy. In some embodiments, the thresholds can be configurable between minimum and maximum values, and in some embodiments, the wireless security sensors or the control panel can compare some or all of the parameters listed in FIG. 5 to the corresponding thresholds listed in FIG. 5.

In summary, the systems and methods disclosed herein can ensure that IEEE 802.15.4 communication occurs on the least noisy operating channel of the IEEE 802.15.4 protocol. As such, communication between the control panel and the wireless security sensors can be optimized, which can lead to optimization in threat detection reporting by the wireless security sensors and optimization of IEEE 802.11 communications within a secured area.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
a wireless transceiver of a control panel of a security system receiving results from a scan of first operating channels of a first wireless protocol conducted by each of a plurality of wireless security sensors that are remote from the control panel;
the control panel determining which of second operating channels of a second wireless protocol include wireless communication via the second wireless protocol;
the control panel determining that a first of the first operating channels of the first wireless protocol fails to overlap with the second operating channels of the second wireless protocol that include the wireless communication via the second wireless protocol;
the control panel determining whether the results from the scan indicate that the first of the first operating channels of the first wireless protocol includes interference at any of the plurality of wireless security sensors; and
when the results from the scan indicate that the first of the first operating channels of the first wireless protocol fails to include the interference at any of the plurality of wireless security sensors, the control panel, via the wireless transceiver, directing each of the plurality of wireless security sensors to migrate wireless communication via the first wireless protocol with the control panel to the first of the first operating channels of the first wireless protocol.

2. The method of claim 1 further comprising:
the control panel instructing each of the plurality of wireless security sensors to conduct the scan.

3. The method of claim 2 wherein the scan includes comparing a measured parameter to a threshold.

4. The method of claim 3 wherein a value of the threshold is based on an installation location of the security system.

5. The method of claim 2 wherein the scan includes comparing each of a plurality of measured parameters to a respective, corresponding one of a plurality of thresholds.

6. The method of claim 1 wherein the first wireless protocol is Institute of Electrical and Electronics Engineers (IEEE) 802.15.4, and wherein the second wireless protocol is IEEE 802.11.

7. The method of claim 1 wherein the control panel directing each of the plurality of wireless security sensors to migrate the wireless communication via the first wireless protocol with the control panel to the first of the first operating channels of the first wireless protocol includes the control panel transmitting a beacon to the plurality of wireless security sensors that includes migration data identifying the first of the first operating channels of the first wireless protocol.

8. The method of claim 1 further comprising:
the control panel instructing each of the plurality of wireless security sensors to conduct the scan responsive to detecting a triggering event.

9. The method of claim 8 wherein the triggering event includes one or more from a group consisting of a current time equaling a predetermined time, a router connected to the control panel changing an occupied one of the second operating channels of the second wireless protocol, a WiFi source changing the occupied one of the second operating channels of the second wireless protocol, the control panel receiving the results from the scan indicating the interference from one of the plurality of wireless security sensors, the control panel detecting an operating channel jam, or the control panel detecting packet loss.

10. The method of claim 1 further comprising:
the control panel determining that a second of the first operating channels of the first wireless protocol fails to overlap with the second operating channels of the second wireless protocol that include the wireless communication via the second wireless protocol; and
when the results from the scan indicate that the first of the first operating channels of the first wireless protocol includes the interference at any of the plurality of wireless security sensors and the second of the first operating channels of the first wireless protocol fails to include the interference at any of the plurality of wireless security sensors, the control panel, via the wireless transceiver, directing each of the plurality of wireless security sensors to migrate the wireless communication via the first wireless protocol with the control panel to the second of the first operating channels of the first wireless protocol.

11. The system of claim 1 wherein the control panel instructs each of the plurality of wireless security sensors to conduct the scan responsive to detecting a triggering event.

12. The system of claim 11 wherein the triggering event includes one or more from a group consisting of a current time equaling a predetermined time, a router connected to the control panel changing an occupied one of the second operating channels of the second wireless protocol, a WiFi source changing the occupied one of the second operating channels of the second wireless protocol, the control panel receiving the results from the scan identifying the interference from one of the plurality of wireless security sensors, the control panel detecting an operating channel jam, or the control panel detecting packet loss.

13. A system comprising:
a plurality of wireless security sensors; and
a control panel that is remote from the plurality of wireless security sensors and includes a wireless transceiver that communicates with the plurality of wireless security sensors via a first wireless protocol,
wherein the control panel receives, via the wireless transceiver, results from a scan of first operating channels of the first wireless protocol conducted by each of the plurality of wireless sensors,
wherein the control panel determines which of second operating channels of a second wireless protocol include wireless communication via the second wireless protocol,
wherein the control panel determines that a first of the first operating channels of the first wireless protocol fails to overlap with the second operating channels of the second wireless protocol that include the wireless communication via the second wireless protocol,
wherein the control panel determines whether the results from the scan indicate that the first of the first operating channels of the first wireless protocol includes interference at any of the plurality of wireless security sensors, and
wherein, when the results from the scan indicate that the first of the first operating channels of the first wireless protocol fails to include the interference at any of the plurality of wireless security sensors, the control panel, via the wireless transceiver, directs each of the plurality of wireless security sensors to migrate wireless communication via the first wireless protocol with the control panel to the first of the first operating channels of the first wireless protocol.

14. The system of claim 13 wherein the control panel instructs each of the plurality of wireless security sensors to conduct the scan.

15. The system of claim 14 wherein the scan compares a measured parameter to a threshold.

16. The system of claim 15 wherein a value of the threshold is based on an installation location of the control panel.

17. The system of claim 14 wherein the scan compares each of a plurality of measured parameters to a respective, corresponding one of a plurality of thresholds.

18. The system of claim 13 wherein the first wireless protocol is Institute of Electrical and Electronics Engineers (IEEE) 802.15.4, and wherein the second wireless protocol is IEEE 802.11.

19. The system of claim 13 wherein the control panel transmits a beacon to the plurality of wireless security sensors that includes migration data identifying the first of the first operating channels of the first wireless protocol to direct each of the plurality of wireless security sensors to migrate the wireless communication via the first wireless protocol with the control panel to the first of the first operating channels of the first wireless protocol.

20. The system of claim 13 wherein the control panel determines that a second of the first operating channels of the first wireless protocol fails to overlap with the second operating channels of the second wireless protocol that include the wireless communication via the second wireless protocol, and wherein, when the results from the scan indicate that the first of the first operating channels of the first wireless protocol includes the interference at any of the plurality of wireless security sensors and the second of the first operating channels of the first wireless protocol fails to include the interference at any of the plurality of wireless security sensors, the control panel, via the wireless transceiver, directs each of the plurality of wireless security sensors to migrate the wireless communication via the first wireless protocol with the control panel to the second of the first operating channels of the first wireless protocol.

21. A method comprising:
each of a plurality of wireless security sensors scanning a first operating channel of a wireless protocol;
each of the plurality of wireless security sensors determining whether the first operating channel of the wireless protocol includes a measured parameter that exceeds a threshold;
each of the plurality of wireless security sensors reporting to a control panel that is remote from the plurality of wireless security sensors when the first operating channel of the wireless protocol includes the measured parameter that exceeds the threshold; and responsive to the reporting, each of the plurality of wireless security sensors receiving directions from the control panel to migrate wireless communication via the wireless protocol with the control panel to a second operating channel of the wireless protocol, wherein the second operating channel of the wireless protocol fails to include the measured parameter that exceeds the threshold.

\* \* \* \* \*